(12) United States Patent
Kusagaya

(10) Patent No.: US 6,550,944 B2
(45) Date of Patent: Apr. 22, 2003

(54) VEHICLE HEADLAMP

(75) Inventor: Masahiro Kusagaya, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/855,415

(22) Filed: May 15, 2001

(65) Prior Publication Data

US 2001/0043474 A1 Nov. 22, 2001

(30) Foreign Application Priority Data

May 15, 2000 (JP) ........................................ 2000-141223

(51) Int. Cl.[7] ................................................ F21V 1/00
(52) U.S. Cl. ........................ 362/466; 362/465; 362/467; 362/468; 362/427; 362/287; 362/464; 362/512; 362/513; 362/525; 362/526
(58) Field of Search ................................ 362/465, 466, 362/467, 468, 525, 526, 512, 513, 464, 427, 287

(56) References Cited

U.S. PATENT DOCUMENTS

| | | |
|---|---|---|
| 4,733,333 A | 3/1988 | Shibata et al. |
| 4,831,506 A | 5/1989 | Miyazawa |
| 5,209,558 A | 5/1993 | Suzuki et al. |
| 5,339,226 A | 8/1994 | Ishikawa |
| 5,343,371 A | 8/1994 | Kobayashi et al. |
| 5,373,424 A | 12/1994 | Ishikawa |
| 5,379,196 A | 1/1995 | Kobayashi et al. |
| 5,412,543 A | 5/1995 | Kobayashi et al. |
| 5,645,338 A * | 7/1997 | Kobayashi ................. 362/61 |
| 5,660,454 A * | 8/1997 | Mori et al. ................ 362/61 |
| 5,707,129 A * | 1/1998 | Kobayashi ................ 362/66 |
| 5,896,085 A * | 4/1999 | Mori et al. ............... 340/469 |
| 6,293,686 B1 * | 9/2001 | Hayami et al. ............ 362/465 |
| 6,309,094 B1 * | 10/2001 | Woerner ................... 362/539 |
| 6,343,869 B1 * | 2/2002 | Kobayashi ................ 362/37 |

FOREIGN PATENT DOCUMENTS

| | | |
|---|---|---|
| DE | 44 36 684 A1 | 5/1995 |
| DE | 44 39 556 A1 | 5/1996 |
| DE | 198 02 023 A1 | 8/1998 |
| DE | 197 56 437 A1 | 6/1999 |
| DE | 199 22 735 A1 | 12/1999 |
| DE | 199 61 942 A1 | 6/2001 |
| JP | 6-36321 | 11/1994 |

* cited by examiner

Primary Examiner—Sandra O'Shea
Assistant Examiner—Jacob Y. Choi
(74) Attorney, Agent, or Firm—Fish & Richardson P.C.

(57) ABSTRACT

A vehicle headlamp has a unit pivot control mechanism for laterally moving the luminous intensity distribution of a lamp unit by laterally pivoting the lamp unit according to the travel conditions of the vehicle, and a luminous intensity variable control mechanism for varying the luminous intensity distribution by moving a shade of the lamp unit according to the travel conditions of the vehicle. Beam emission can be carried out at emission angles with the luminous intensity distribution conforming to the travel conditions of the vehicle by properly combining beam emission control performed by the unit pivot control mechanism and the luminous intensity variable control mechanism. The result is improved visibility of a road surface ahead of the vehicle.

13 Claims, 10 Drawing Sheets

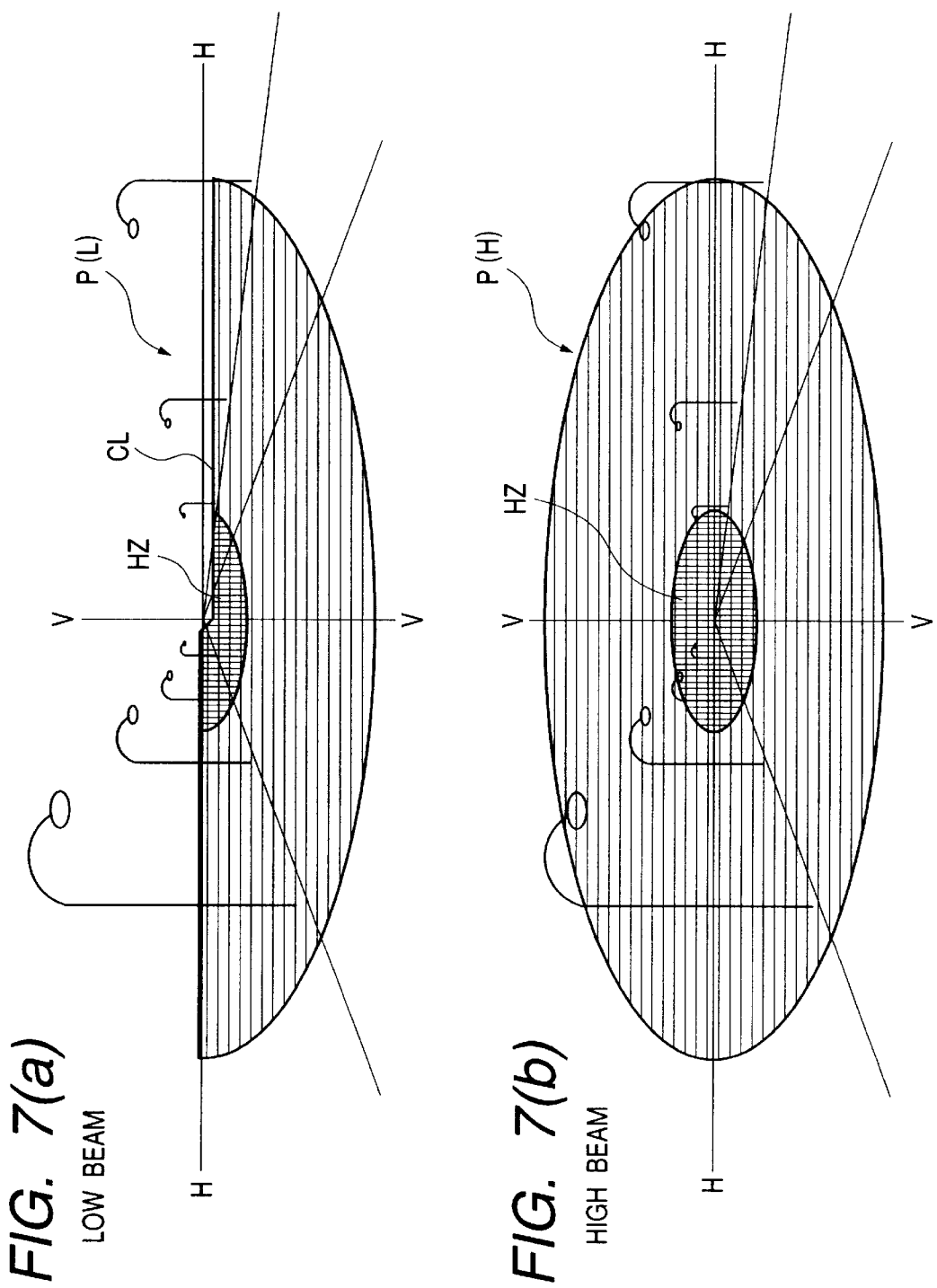

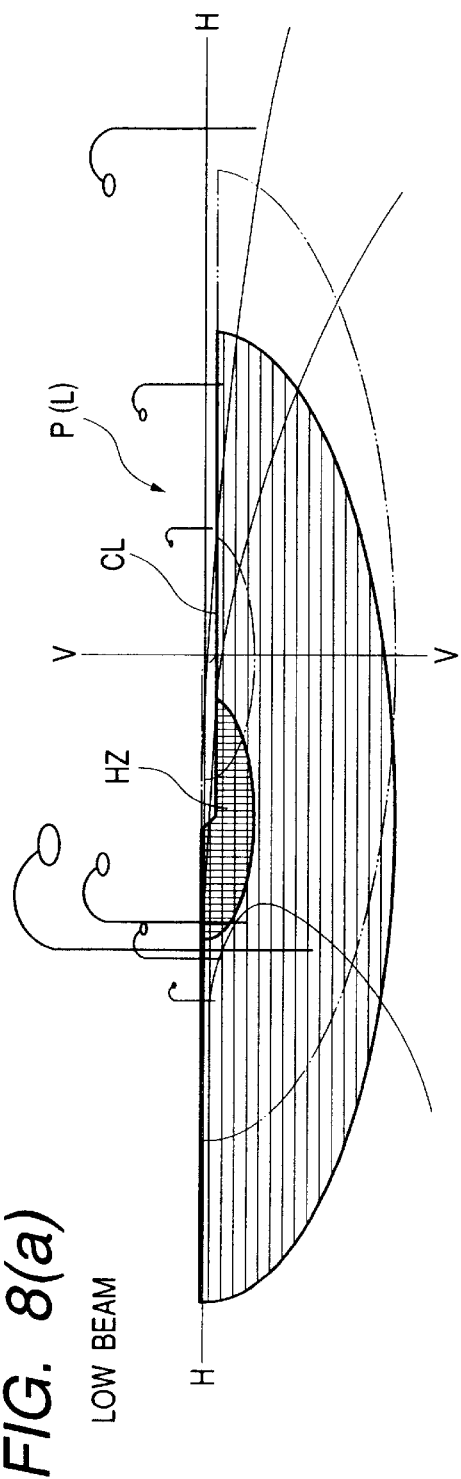
FIG. 8(a) LOW BEAM
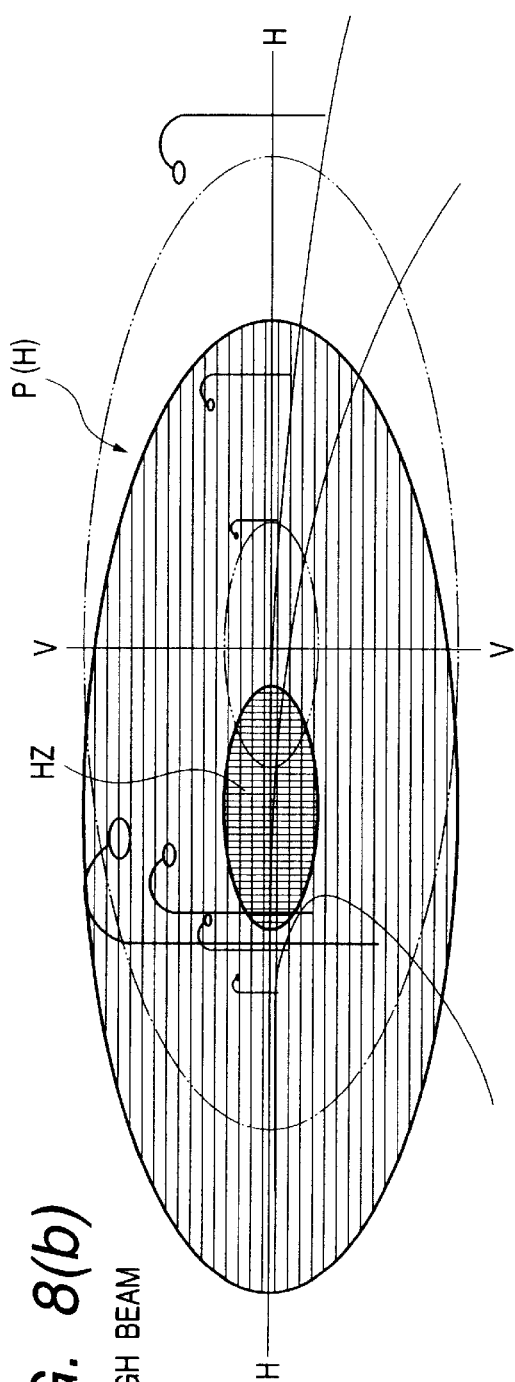
FIG. 8(b) HIGH BEAM

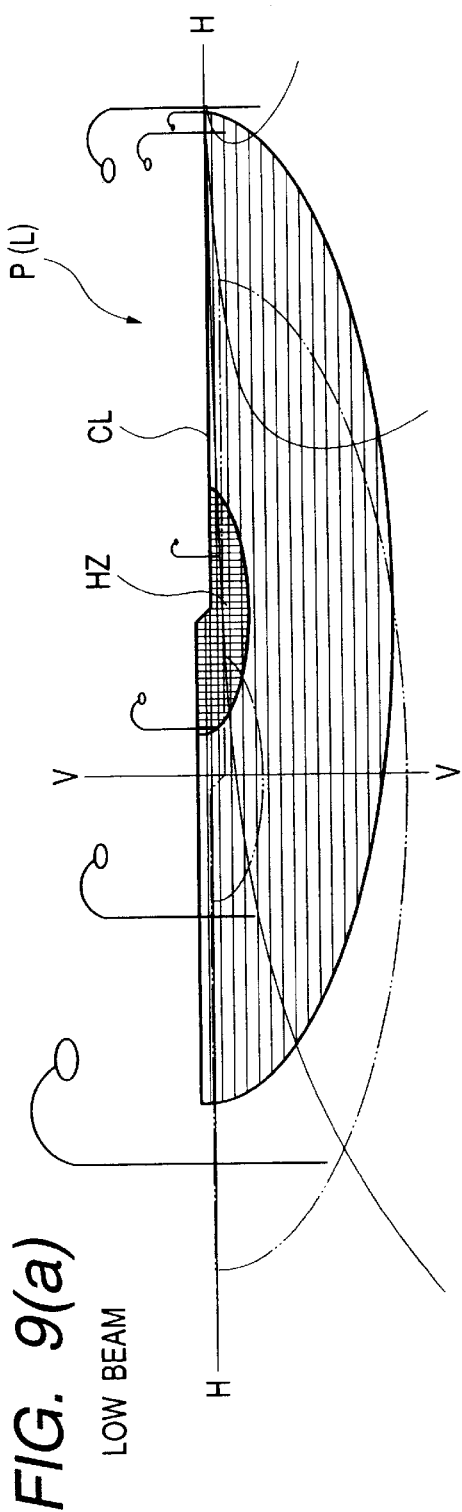
FIG. 9(a) LOW BEAM
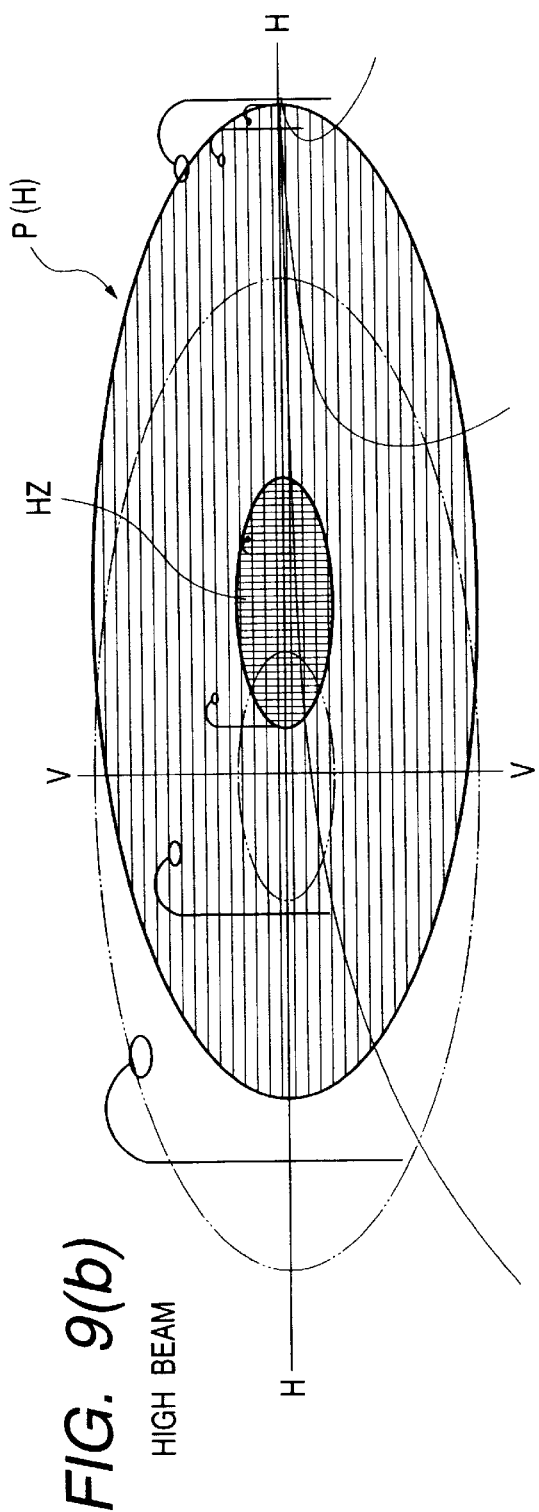
FIG. 9(b) HIGH BEAM

VEHICLE HEADLAMP

BACKGROUND OF THE INVENTION

1. Field of the Invention

The present invention relates to a vehicle headlamp housing a lamp unit within a lamp body for emitting beams forward with a predetermined luminous intensity distribution.

2. Description of the Related Art

Heretofore, there are a known vehicle headlamp housing a lamp unit within a lamp body. JP-B-6-36321 discloses an example of a fog lamp for laterally displacing a luminous intensity distribution by laterally pivoting the ti t movable reflective mirror of a lamp unit in conformity with a rudder angle. The application of the lamp unit to the vehicle headlamp makes it possible to enhance the visibility of a road surface ahead of a vehicle.

However, difficulty arises in carrying out beam emission with a sufficient quantity of light in the direction of a winding road surface on which a vehicle is traveling when only laterally pivoting a movable reflective mirror of the lamp unit. When the vehicle travels on the winding road having a small curvature radius, or makes a turn at an intersection, the movable reflective mirror will have to be largely turned left and right. It is therefore difficult to carry out beam emission with a luminous intensity distribution conforming to the travel conditions of the vehicle because the luminous intensity distribution is considerably deformed in cases where the movable reflective mirror is largely pivoted in the lateral direction.

SUMMARY OF THE INVENTION

The present invention provides a vehicle headlamp which houses a lamp unit in a lamp body for emitting beams forward with a predetermined luminous intensity distribution and is capable of emitting beams with the predetermined luminous intensity distribution, and at emission angles according to the travel conditions of a vehicle.

The invention is arranged so that a luminous intensity distribution can laterally be displaced by laterally pivoting the whole lamp unit. The luminous intensity distribution itself can be varied by moving the component element of the lamp unit.

More specifically, a vehicle headlamp having a lamp body for housing a lamp unit for emitting beams forward with a predetermined luminous intensity distribution comprises:

a luminous intensity variable control mechanism for varying the luminous intensity distribution by moving a component element of the lamp unit according to the travel conditions of a vehicle; and a pivot control mechanism for laterally pivoting the lamp unit according to the travel conditions of the vehicle.

The 'lamp unit' is not limited to a specific configuration but may be a so-called parabolic lamp unit having a reflector formed with a rotary parabolic surface with, for example, a rotary parabolic surface or the like as a reference. Alternatively, the lamp unit may be a so-called projector type lamp unit having a light source disposed in a manner substantially coaxial with an optical axis extending in the longitudinal direction of the vehicle, a reflector for reflecting light from the light source forward closer to the optical axis, a condenser lens provided in front of the reflector, and a shade which is provided between the condenser lens and the reflector and used for shielding part of the light reflected from the reflector.

In connection with the light source of the 'lamp unit', it is not limited to a specific one in construction but may be a discharge light-emitting portion of a discharge bulb, or the filament of an incandescent bulb such as a halogen bulb, or the like.

The 'travel conditions of a vehicle' means various conditional quantities regarding the travel of a vehicle and external information. For example, travel conditions of a vehicle may include vehicle speed, a rudder angle, vehicle posture, a vehicle-to-vehicle distance with respect to any preceding car, weather, navigation data, and the like.

The 'component element' of the lamp unit is not limited to a specific configuration or component, but may be any component capable of being used to vary the luminous intensity distribution of the lamp unit by moving the component element. For example, a component element may be a shade, a light source bulb, a reflector, and the like.

As described by the construction of the vehicle headlamp according to the invention, the vehicle headlamp is so arranged as to vary the luminous intensity distribution by moving the component element of the lamp unit housed in the lamp body with the use of the luminous intensity variable control mechanism. In addition, the luminous intensity distribution is so arranged as to be laterally displaced by using the unit pivot control mechanism to laterally pivot the lamp unit, by properly combining beam emission control performed by the luminous intensity variable control mechanism and the unit pivot control mechanism. Therefore, the beam emission can be carried out at the emission angle with the luminous intensity distribution conforming to the travel conditions of the vehicle. The result is improved visibility of the road surface ahead of the vehicle.

With the arrangement above, the adoption of the projector type lamp unit as a lamp unit makes obtainable the following effect.

More specifically, as the vehicle headlamp according to the invention is so arranged as to move the component element of the lamp unit and to laterally pivot the lamp unit itself, a space for the purpose must be secured in the lamp body. Therefore, the adoption of the projector type lamp unit whose lamp unit itself can be made compact results in reducing its space. In connection with the projector type lamp unit, moreover, there are many kinds of component elements selectable as movable components for varying their luminous intensity distributions (e.g., a condenser lens is also selectable), and thus the luminous intensity variable control mechanism is adaptable for suitable use in the structure of the vehicle headlamp.

The use of the shade as the movable component element permits delicate variation of the luminous intensity distribution by moving the shade, whereby a luminous intensity distribution fit for the travel conditions of the vehicle is obtainable.

BRIEF DESCRIPTION OF THE DRAWINGS

FIGS. 7(a) and 7(b) are diagrams showing a forward luminous intensity distribution emitted from the lamp body during the straight travel of a vehicle.

FIGS. 8(a) and 8(b) are diagrams showing a forward luminous intensity distribution emitted from the lamp body when the traveling vehicle is making a left turn.

FIGS. 9(a) and (b) are diagrams showing a luminous intensity distribution emitted from the lamp body when the traveling vehicle is making a right turn.

DETAILED DESCRIPTION OF THE PREFERRED EMBODIMENTS

Embodiments of the present invention will now be described with reference to the drawings.

Figure 1:
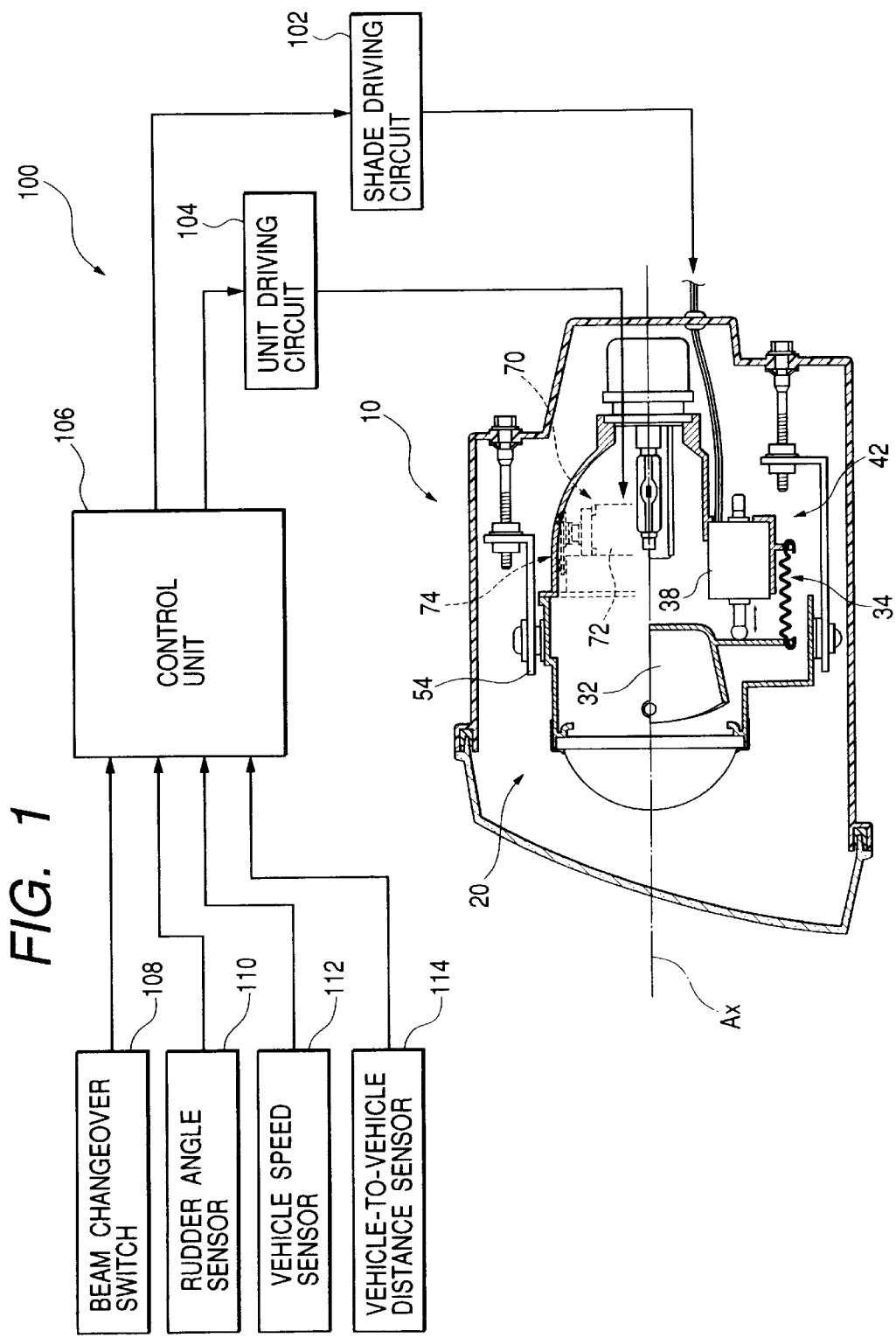
FIG. 1 is an overall block diagram of a vehicle headlamp according to an embodiment of the invention.

FIG. 1 is an overall block diagram of a vehicle headlamp embodying the invention.

As shown in FIG. 1, the vehicle headlamp 100 is furnished with a headlamp body 10, a shade driving circuit 102, a unit driving circuit 104, and a control unit 106. Detection signals from a beam changeover switch 108, a rudder angle sensor 110, a vehicle speed sensor 112, a vehicle-to-vehicle distance sensor 114 are input to the control unit 106.

The beam changeover switch 108 is a switch for selectively switching low- and high-beam luminous intensity distributions. The vehicle-to-vehicle distance sensor 114 may include a millimeter wave radar and the like.

In the vehicle headlamp 100, beam emission control is performed according to the travel conditions of a vehicle on the basis of a control signal from the control unit 106. The construction of the headlamp body 10 will be described before the details of beam emission control is described.

Figure 2:
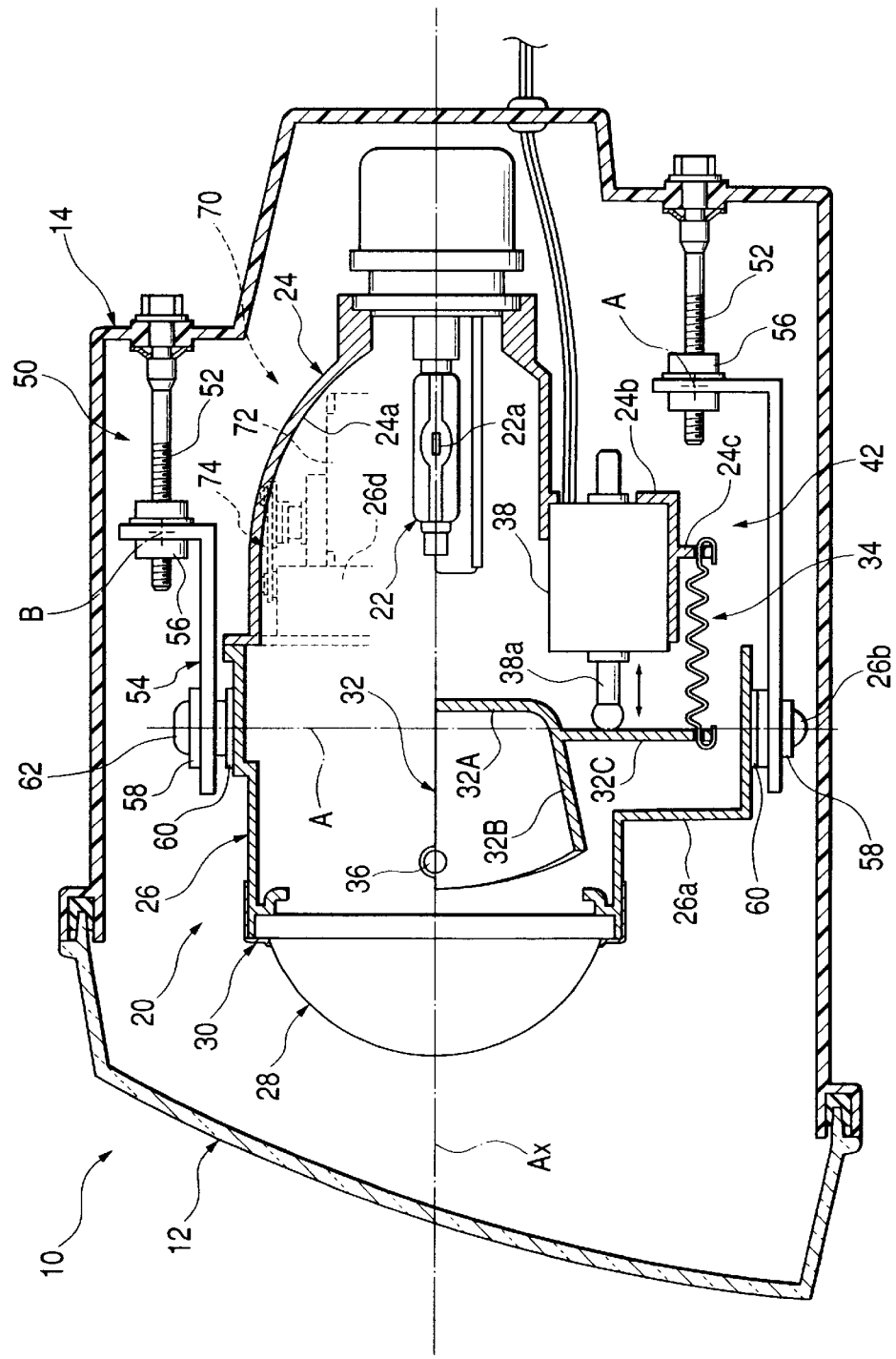
FIG. 2 is a cross-sectional side view of the headlamp body of the vehicle headlamp.

FIG. 2 is a cross-sectional side view of the headlamp body 10.

As shown in FIG. 2, a lamp unit 20 is housed in a lamp chamber formed with a plain transparent cover 12 and a lamp body 14 of the headlamp body 10.

While the lamp unit 20 is supported by a support frame 54 surrounding the lamp unit 20, the lamp unit 20 is tiltably supported by the lamp body 14 via an aiming mechanism 50 vertically and laterally. The aiming mechanism 50 is such that the support frame 54 is coupled via an aiming nut 56 to each aiming screw 52 rotatably fitted to a plurality of places of the lamp body 14. The aiming mechanism 50 permits an initial adjustment of the optical axis Ax of the lamp unit 20 (adjustment in conforming the optical Ax to the longitudinal direction of the vehicle).

Figure 3:
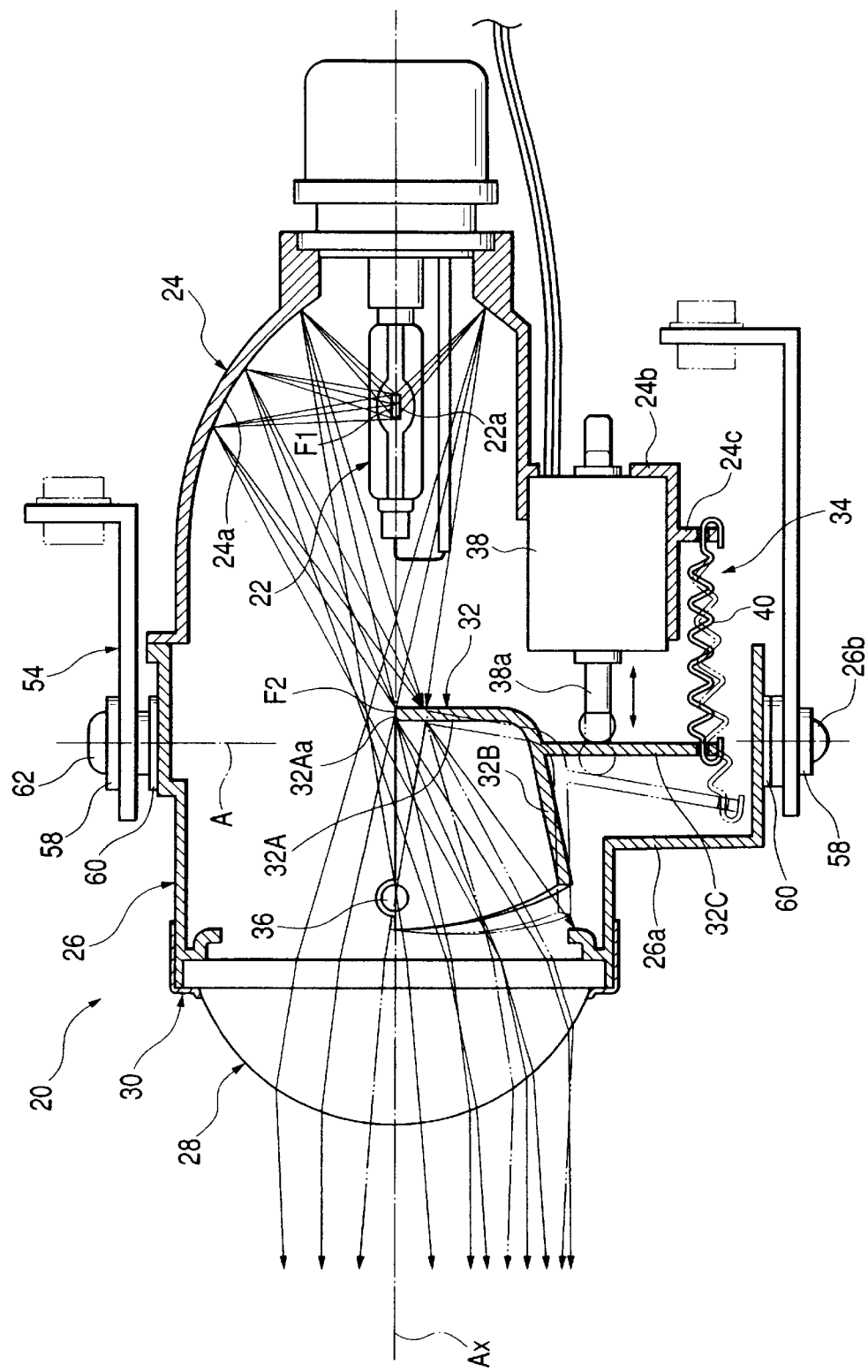
FIG. 3 is an enlarged sectional side view of the lamp unit together with a support frame of the vehicle headlamp.
Figure 4:
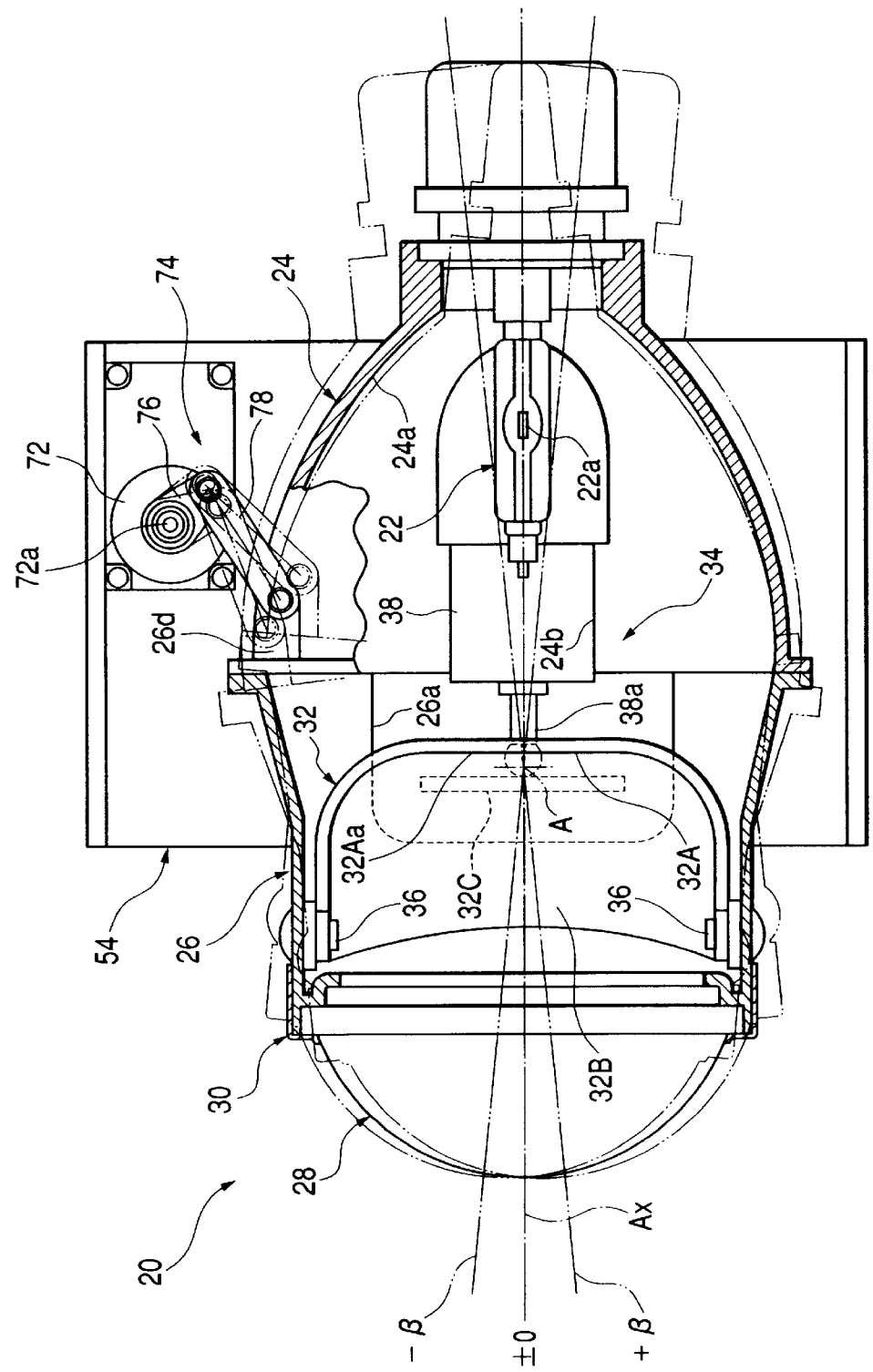
FIG. 4 is a sectional plan view of the lamp unit together with the support frame.
Figure 5:
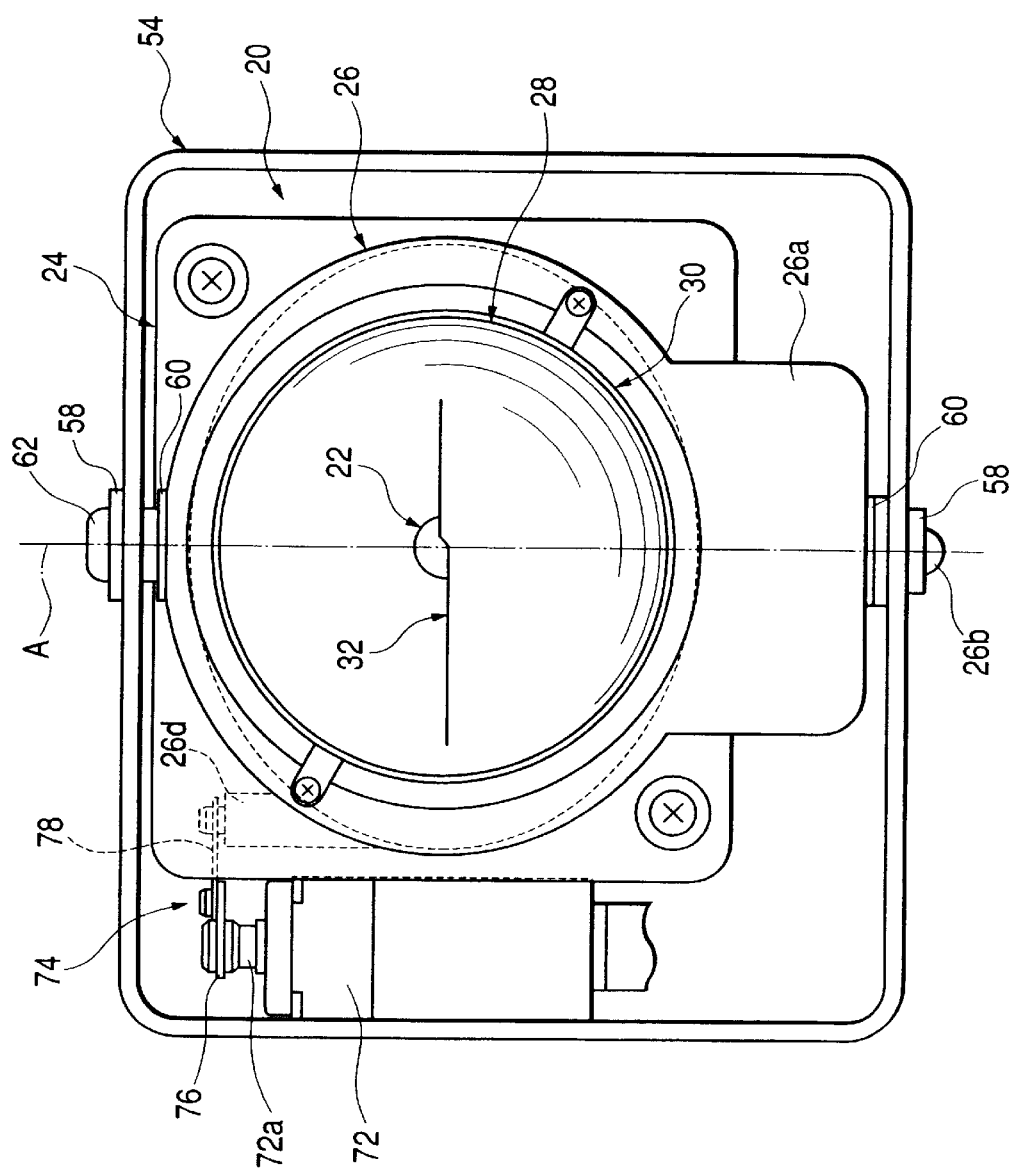
FIG. 5 is an elevational front view of the lamp unit together with the support frame.
Figure 6:
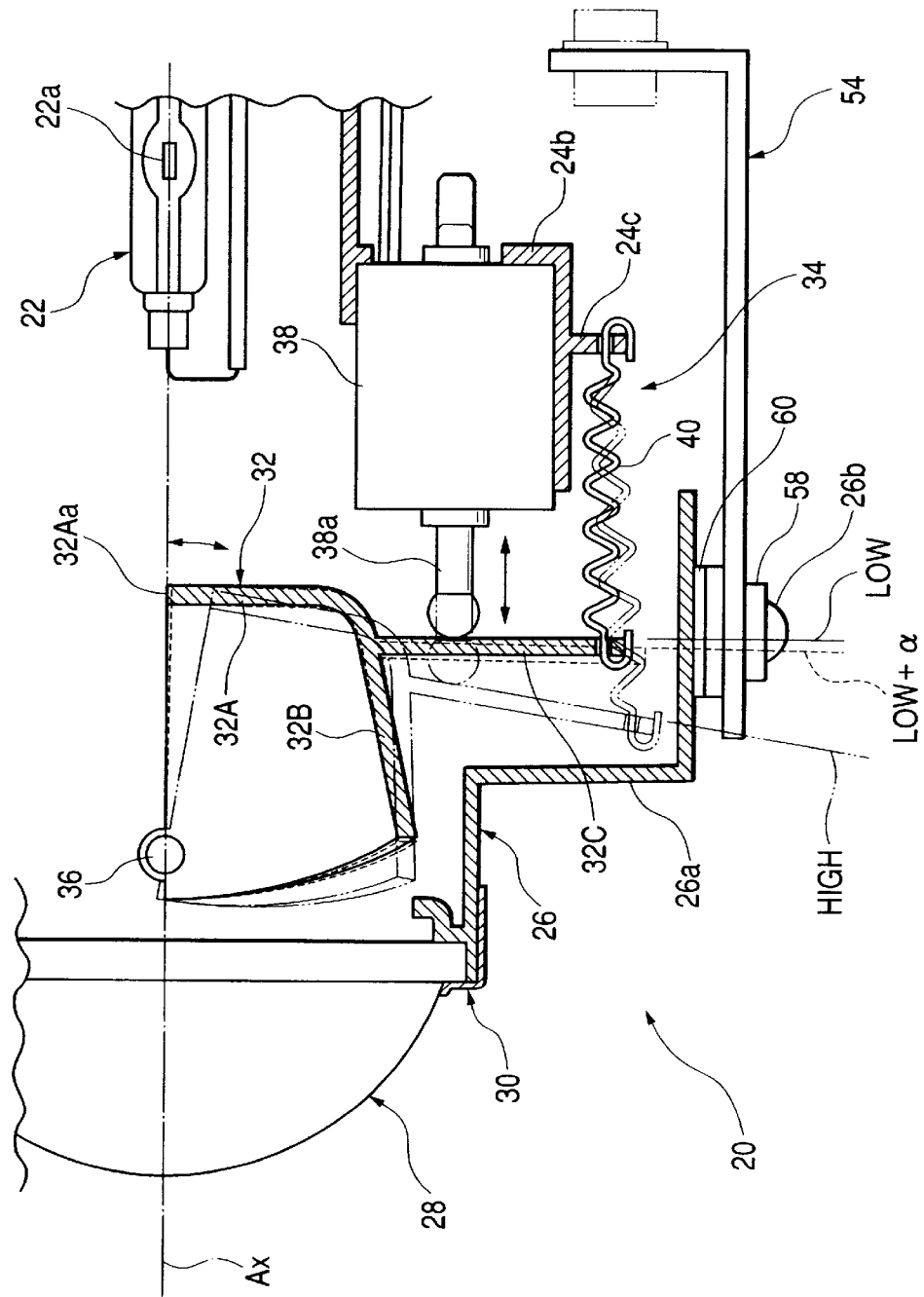
FIG. 6 is a detailed view of a portion of the lamp unit of FIG. 3.

FIGS. 3, 4 and 5 are a cross-sectional side view, a sectional top plan view and an elevational front view shown together with the support frame 54 of the lamp unit 20. FIG. 6 is a detailed view of a portion of the lamp unit of FIG. 3.

As shown in FIGS. 3 to 6, the lamp unit 20 is a projector type lamp unit having a discharge bulb 22, a reflector 24, a holder 26, a condenser lens 28, a retaining ring 30, a shade 32, and a shade driving mechanism 34.

The discharge bulb 22 may be a metal halide bulb that is fitted to the reflector 24 in such a manner that its discharge light emitting portion 22a (light source) is disposed coaxially with the optical axis Ax.

The reflector 24 has an elliptic spherical reflective surface 24a centering around the optical axis Ax. The reflective surface 24a is formed in such a way that the sectional configuration including the optical axis Ax is set elliptic and that its eccentricity is set to grow gradually greater from its vertical to horizontal section. However, the rear apex of the ellipse forming each of the sections is set at the same position. The light source 22a is disposed at a first focal point F1 of the ellipse forming the vertical section of the reflective surface 24a. Therefore, the reflective surface 24a is adapted to reflect light from the light source 22a forward toward the vicinity of the optical axis Ax and also to substantially converge the light to a second focal point F2 of the ellipse within the vertical section including the optical axis Ax.

The holder 26 has a cylindrical shape extending forward from the front end opening portion of the reflector 24 and is fixedly supported in its rear end portion, and also fixedly supports the condenser lens via the retaining ring 30 in its front end portion. Further, a downwardly-expanding portion 26a is formed in the lower end portion of the holder 26.

The condenser lens 28 is a flat convex lens having a convex front surface and a flat rear surface, its rear focal point position being placed in conformity with the second focal point F2 of the reflective surface 24a of the reflector 24, whereby the condenser lens 28 allows the light reflected from the reflective surface 24a of the reflector 24 to concentrate on a point close to the optical axis Ax.

The shade 32 comprises a shade body portion 32A extending substantially along a vertical plane crossing the optical axis Ax at right angles, a substantially semi-cylindrical portion 32B extending forward from the peripheral edge portion of the shade body portion 32A, and a bracket portion 32C extending downward inside the downwardly-expanding portion 26a of the holder 26 from the lower end portion of the substantially semi-cylindrical portion 32B. The shade 32 is pivotally provided in the lower portion of the inner space of the holder 26. More specifically, the shade 32 is supported by the holder 26 via a pivotal pin 36 in the front upper end portions of both the left and right sides of the substantially semi-cylindrical portion 32B, so that the shade 32 is able to pivot between low- and high-beam forming positions (positions shown by solid lines) around a horizontal axis connecting both the pivotal pins 36.

When the shade 32 is in the low-beam forming position, the upper end edge 32Aa of the shade body portion 32A is so arranged as to pass the second focal point F2 and to remove the upward light emitted from the lamp unit 20 by partly shading the light reflected from the reflective surface 24a, whereby to obtain light for low-beam emission (the beams shown by solid lines) emitted downwardly with respect to the optical axis Ax. Thus, the low-beam luminous intensity distribution P(L) of the left luminous intensity having a "Z-shaped" cut-off line (CL) (on laterally different levels) is formed as shown in FIG. 7(a) When the shade 32 is in the high-beam forming position, the s shade 32 allows the upward emission light to be emitted from the lamp unit 20 by releasing the shading of the light reflected from the reflective surface 24a whereby to obtain light for high-beam emission (the beams shown in FIG. 3 by solid and chain double-dashed lines). Thus, the high-beam luminous intensity distribution P(H) is formed as shown in FIG. 7(b). Areas shown by HZ in these low- and high-beam luminous intensity distributions P(L) and P(H) are hot zones (high luminous intensity areas) in the respective luminous intensity distributions.

The shade driving mechanism 34 is provided with a motor driving unit 38 and a tension coil spring 40. The driving mechanism is used to pivot the shade 32 between the lowand high-beam forming positions and also to stop the shade 32 in any desired position therebetween. Beam switching between the low and high beams is thereby carried out and by stopping the shade 32 in an intermediate position between the low- and high-beam forming positions, beam emission can be carried out with intermediate luminous intensity distribution between the low- and high-beam luminous intensity distributions. According to this embodiment of the invention, the shade 32 can be stopped in the intermediate position (LOW+α) closer to the high-beam forming position (HIGH) rather than the low-beam forming position as shown by a broken line in FIG. 6. The aforementioned angle α may be set at 0.5°.

The output shaft 38a of the motor driving unit 38 is disposed as to extend in parallel to the optical axis Ax, and the motor driving unit 38 is fixedly fitted in a motor housing portion 24b formed in the lower area of the reflector 24. This motor driving unit 38 is used to move the output shaft 38a in the longitudinal direction of the vehicle as a motor (not shown) operates to drive the motor driving unit 38 via a gear (not shown) such that the bracket portion 32C contacts the shade 32 in the front end spherical portion of the output shaft 38a.

The tension coil spring 40 is so arranged as to extend in parallel to the optical axis Ax and its front end portion is retained by the bracket portion 32C of the shade 32, whereas its rear end portion is retained by a tab 24c projecting downward from the motor housing portion 24b. The tension coil spring 40 resiliently urges the shade 32 toward the low-beam forming position whereby to prevent the shade 32 from becoming weak in the joints by absorbing a backlash of the motor driving unit 38.

As shown in FIG. 1, the motor driving unit 38 of the shade driving mechanism 24 is connected via the shade driving circuit 102 to the control unit 106 and driven by the shade driving circuit 102 according to control signals from the control unit 106. Thus, the shade driving mechanism 34, the shade driving circuit 102 and the control unit 106 are used to form a luminous intensity variable control mechanism 42 for varying the luminous intensity distribution of the lamp unit 20 by moving the shade 32 according to the travel conditions of the vehicle.

As shown in FIGS. 2 to 5, the lamp unit 20 is supported so that it can laterally pivot around a vertical axis A which crosses the optical axis Ax at right angles with respect to the support frame 54.

A pin 26b protruding downward is formed in a position on the vertical axis A in the downwardly-expanding portion 26a of the holder 26. The pin 26b is fitted in and supported by the support frame 54 via a collar 58 and a spacer 60. A boss (not shown) projecting upward is formed in a position on the vertical axis A in the upper end portion of the holder 26 and fitted in the support frame 54 via the collar 58 and the spacer 60. A screw 62 may be fixedly screwed into the boss via the collar 58.

A pivot control mechanism unit 70 for pivoting the lamp unit 20 according to the travel conditions of the vehicle is provided near the side of the lamp unit 20.

The pivot control mechanism 70 comprises a motor 72 fixed to the support frame 54 and coupled to the lamp unit 20 via a link mechanism 74, the unit driving circuit 104 connected to the motor 72, and the control unit 106. The unit pivot control mechanism 70 drives the motor 72 using the unit driving circuit 104 according to a control signal from the control unit 106. A driving force is transmitted to the lamp unit 20 via the link mechanism 74 to pivot the lamp unit 20 within a range of angles of β (e.g., β=6°) in both the respective lateral directions from the initial adjustment position (the position where the optical axis Ax conforms to the longitudinal direction of the vehicle) around the vertical axis A.

The link mechanism 74 comprises a pivotal lever 76 fixed to the output shaft 72a of the motor 72, and a link 78 having one end portion coupled to the pivotal lever 76 with a pin, and the other end portion coupled to a link-fixing projected portion 26d of the reflector 24.

Beam emission control performed in the vehicle headlamp 100 according to this embodiment of the invention will now be described.

According to this embodiment of the invention, beam emission control is performed by the unit pivot control mechanism 70 and the luminous intensity variable control mechanism 42 according to the travel conditions of the vehicle.

More specifically, while the vehicle is traveling straight on a flat road, the beam emission has the luminous intensity distribution as shown in FIGS. 7(a) and 7(b). At this time, the unit pivot control mechanism 70 sets the lamp unit 20 to an initial adjustment position, whereas the luminous intensity variable control mechanism 42 moves the shade 32 to a low- or high-beam forming position in response to the operation of a beam changeover switch 108. In response, the beam emission is carried out with the low-beam luminous intensity distribution P(L) shown in FIG. 7(a), or the high-beam luminous intensity distribution P(H) shown in FIG. 7(b).

In cases where a steering operation is performed during the travel of the vehicle, beam emissions are carried out with the luminous intensity distributions shown in FIGS. 8(a) and 8(b) or 9(a) and 9(b).

More specifically, when a left turn steering operation is performed, the luminous intensity distributions P(L) and P(H) are displaced to the left by pivoting the lamp unit 20 to the left to result in the distributions shown in FIGS. 8(a) and 8(b), whereby to enhance the visibility of a road surface ahead of the traveling vehicle during a left turn. The displacement of the luminous intensity distributions P(L) and P(H) is carried out by the control unit 106 which drives the motor 72 via the unit driving circuit 104 according to the detected signal from a rudder angle sensor 110. At this time, displacing the luminous intensity distributions P(L) and P(H) leftward to a greater degree is preferred for enhancing the visibility of the road surface ahead of the traveling vehicle during a left turn when the curvature radius of the road is small. Consequently, when the rudder angle increases, the leftward pivotal angle of the lamp unit 20 increases.

When a right turn steering operation is performed, the luminous intensity distributions P(L) and P(H) are displaced to the right by pivoting the lamp unit 20 to the right resulting in the beam distributions shown in FIGS. 9(a) and 9(b), whereby to enhance the visibility of the road surface ahead of the traveling vehicle during a right turn. At this time, the rightward pivotal angle of the lamp unit 20 increases as the rudder angle grows larger as the road curves more to the right. However, when a right turn steering operation is performed during the low-beam emission, the lamp unit 20 is pivoted to the right and the shade 32 is moved to an intermediate position that is upward by 0.5° from the low-beam forming position, so as to displace the position of the cut-off line CL of the low-beam luminous intensity distribution P(L) upward by 0.5° as shown in FIG. 9(a). The movement of the cut-off line CL is controlled by the control unit 106 which drives the motor driving unit 38 of the shade driving mechanism 34 via the shade driving circuit 102 according to the detected signal from the rudder angle sensor 110.

As shown in FIG. 9(a), the right half of the cut-off line CL is downwardly stepped, and the left portion of the cut-off line CL is moved upward when a right turn steering operation is performed whereby to enhance the visibility of the road surface in the distance ahead of the vehicle. As the hot zone HZ of the low-beam luminous intensity distribution P(L) is not positioned on the oncoming car lane side during the curved travel of the vehicle, there is no concern of giving a blinding glare to the driver of any oncoming car.

The cut-off line CL is not moved upward when a left turn steering operation is performed because as the left half of the cut-off line CL is upwardly stepped, the distant visibility of the road surface ahead of the traveling vehicle as it curves to the left can be secured even though the cut-off line CL is not moved upward. If the cut-off line CL were to be moved upward during a left turn, the hot zone HZ of the low-beam luminous intensity distribution P(L) would impinge on the oncoming car lane side, which may result in giving glare to the driver of an oncoming car.

Figure 10:
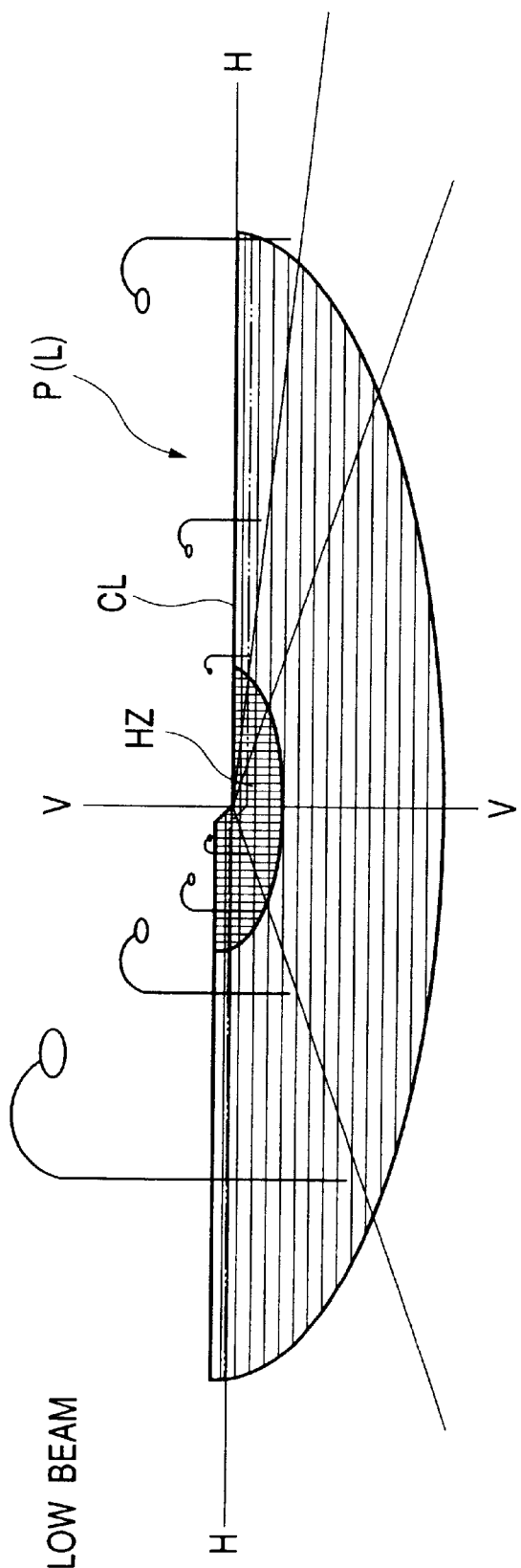
FIG. 10 is a diagram showing the forward low-beam luminous intensity distribution emitted from the lamp body when no preceding car exists nearby.

When the vehicle-to-vehicle distance with respect to the preceding car increases to at least a predetermined value (e.g., 50 m or greater), even while the vehicle is traveling straight on, the shade 32 is moved to an intermediate position upward by 0.5° from the low-beam forming position in the initial condition of low-beam emission. Thus, the position of the low-beam luminous intensity distribution P(L) itself as shown in FIG. 10 is not changed, but the upward displacement of the cut-off line CL by 0.5° is effected. The result is that the far visibility of a road surface in the distance ahead of the vehicle is sufficiently enhanced as the low-beam luminous intensity distribution P(L) (particularly, the hot zone HZ) is expanded into the distance. Since the vehicle-to-vehicle distance with respect to the preceding car is normally long during high speed travel, increased vehicle travel safety during high speed travel is accomplished by sufficiently enhancing the far visibility. Because the vehicle-to-vehicle distance with respect to the preceding car is sufficiently secured, no great glare is given to the driver of the preceding car even though the upward displacement of the cut-off line CL by 0.5° is effected. The adjustment of the cut-off line CL is made by the control unit 106 which drives the motor driving unit 38 of the shade driving mechanism 34 via the shade driving circuit 102 according to the detected signal from the vehicle-to-vehicle distance sensor 114.

As described above in detail, since the vehicle headlamp 100 according to this embodiment is so arranged as to vary the luminous intensity distribution by moving the shade 32 of the lamp unit 20 housed in the lamp body 14 with the use of the luminous intensity variable control mechanism 42, and to laterally pivot the luminous intensity distribution by laterally pivoting the lamp unit 20 with the use of unit pivot control mechanism 70, the beam emission can be carried out at the emission angle with the luminous intensity distribution conforming to the travel conditions of the vehicle. The result is improved visibility of the road surface ahead of the traveling vehicle.

The adoption of a projector type lamp unit for use as the lamp unit 20 according to this embodiment results in a compact lamp unit 20 and a compact shade driving mechanism 34 for moving the shade 32. Consequently, use of a projection type lamp unit increases the freedom of forming the vehicle headlamp 100.

Moreover, the adoption of the shade 32 as a component element for varying the luminous intensity distribution makes it easy to delicately vary the position of the cut-off line CL by moving the shade 32. Such operation permits a suitable low-beam luminous intensity distribution P(L) to be obtained depending on the travel conditions of the vehicle.

Although the lamp unit 20 may be pivoted in both the left and right directions from the initial adjustment position, it may be so arranged as to pivot in only one direction. With this arrangement, the lamp unit 20 can be pivoted more accurately. For example, a pair of left and right lamp bodies 10 may be used to share the pivoting of the lamp unit 20 with each other. For example, when a leftward steering operation is performed, the lamp unit 20 of the left-side lamp body 10 on the left side of the vehicle is pivoted leftward, whereas when a rightward steering operation is performed, the lamp unit 20 of the right-side lamp body 10 on the right side of the vehicle is pivoted rightward.

What is claimed is:

1. A vehicle headlamp having a lamp body for emitting beams forward with a predetermined luminous intensity distribution, comprising:
   a lamp unit housed in the lamp body and including a light source disposed in a manner substantially coaxial with an optical axis extending in a longitudinal direction of the vehicle, a reflector for reflecting light from said light source forward closer to said optical axis, a condenser lens provided in front of said reflector, and a provided between said condenser lens and said reflector;
   a luminous intensity variable control mechanism for varying said luminous intensity distribution by moving the component element of said lamp unit according to the travel conditions of a vehicle; and
   a pivot control mechanism including a motor connected to a support frame within the headlamp body, a single link mechanism coupling the motor to the lamp unit, a driving circuit connected to the motor, and a control unit connected to the driving circuit, the pivot control mechanism for laterally pivoting said lamp unit according to the travel conditions of the vehicle.

2. The vehicle headlamp according claim 1, wherein the component is a shade, and said luminous intensity variable control mechanism is so arranged as to vary said luminous intensity distribution by moving said shade.

3. A vehicle headlamp comprising:
   a head lamp body including a lamp unit with a light source disposed in a manner substantially coaxial with an optical axis extending in a longitudinal direction of the vehicle, a reflector for reflecting light from said light source forward closer to said optical axis, a condenser lens provided in front of said reflector, and a component which is provided between said condenser lens and said reflector;
   a luminous intensity variable control mechanism for varying a luminous intensity distribution according to travel conditions; and
   a pivot control mechanism including a motor connected to a support frame within the headlamp body, a single link mechanism coupling the motor to the lamp unit, a driving circuit connected to the motor, and a control unit connected to the driving circuit, the pivot control mechanism for laterally pivoting the lamp unit according to travel conditions.

4. The vehicle headlamp of claim 3, wherein the lamp unit includes a light source disposed substantially coaxial with an optical axis extending in a longitudinal direction of the vehicle.

5. The vehicle headlamp of claim 3, wherein the component is a shade.

6. The vehicle headlamp of claim 5 wherein the luminous intensity variable control mechanism is configured to move the shade.

7. The vehicle headlamp of claim 3 wherein the lamp unit is supported by a frame such that the lamp unit can laterally pivot about an axis substantially perpendicular to an optical axis of the lamp unit.

8. A method for controlling the beam emitted from a vehicle headlamp comprising:

moving a component of a lamp unit according to vehicle travel conditions to vary a luminous distribution of the beam; and pivoting the lamp unit laterally according to vehicle traveling conditions, wherein a shade is moved to an intermediate position if a low-beam is being emitted and if a vehicle-to-vehicle distance is at least a predetermined value.

9. The method of claim 8 wherein if a left turn steering operation is performed, a rudder angle sensor generates a signal and the lamp unit is pivoted to the left.

10. The method of claim 9 wherein as the rudder angle signal increases, a left pivot angle of the lamp unit also increases.

11. The method of claim 8 wherein if a right turn steering operation is performed, a rudder angle sensor generates a signal and the lamp unit is pivoted to the right.

12. The method of claim 11 wherein as the rudder angle signal increases, a right pivot angle of the lamp unit also increases.

13. The method of claim 12 wherein if the emitted beam is a low-beam emission, then a shade is moved to an intermediate position to displace a cut-off line of a low beam luminous intensity distribution.

* * * * *